April 17, 1951     D. W. MOORE, JR     2,549,624
PNEUMATIC TEMPERATURE-RESPONSIVE APPARATUS
Filed Aug. 28, 1947
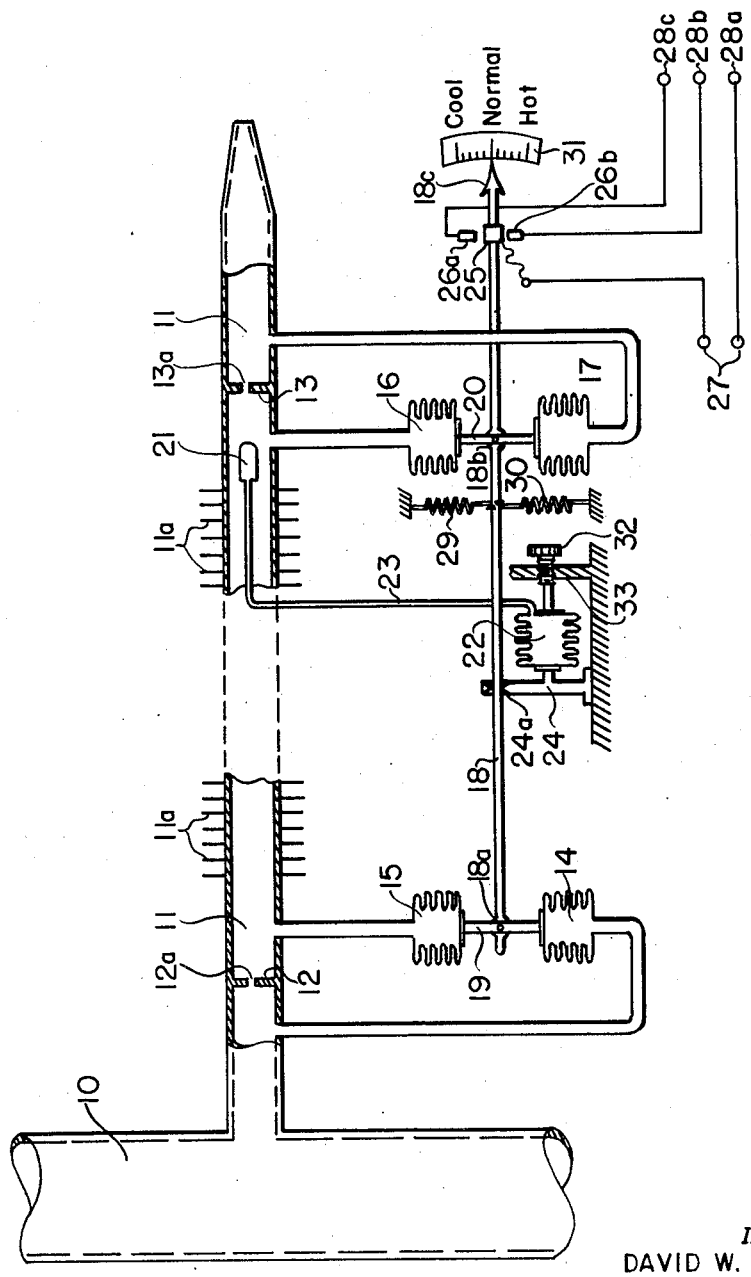
INVENTOR.
DAVID W. MOORE, Jr.
BY Laurence B. Dodds
ATTORNEY Patented Apr. 17, 1951

2,549,624

UNITED STATES PATENT OFFICE 2,549,624

PNEUMATIC TEMPERATURE-RESPONSIVE APPARATUS

David W. Moore, Jr., New York, N. Y., assignor to Fairchild Camera and Instrument Corporation, a corporation of Delaware Application August 28, 1947, Serial No. 770,961

9 Claims. (Cl. 73—357)

This invention relates to pneumatic temperature-responsive apparatus and, while it is of general application, is particularly adapted to the measurement of the temperature of an elastic fluid at a temperature so high that ordinary temperature-measuring apparatus is inapplicable, for example, to the measurement of the temperature of the combustion gases in an internal combustion gas turbine.

In applicant's copending application Serial No. 604,867, filed July 13, 1945, entitled "Elastic-Fluid Temperature-Responsive System," assigned to the same assignee as the present application, there is described and claimed a pneumatic temperature-responsive apparatus utilizing the basic principles of Boyle's law, in combination with Gay-Lussac's law or Charles' law, namely, that for any given mass of perfect gas the following equation is satisfied under all conditions of temperature and pressure:

$$PV = RT$$

where

P = absolute pressure of the gas
V = volume of the gas
T = temperature of the gas
R = the gas constant.

In the system of that application, if a quantity of high-temperature elastic fluid is extracted from its container, cooled, and its mass flow measured, regulated, or otherwise determined, it is shown that the volumetric flow of the hot gas through a metering orifice, as determined by the differential pressure across such orifice, is representative of a temperature factor of the hot fluid and, if the static high pressure is maintained constant, is representative of the actual temperature of the fluid on a properly calibrated scale.

The present invention represents a simplification of the pneumatic temperature-responsive system of aforesaid copending application in which the necessity for determining the mass flow of the elastic fluid in the conduit is eliminated and there is obtained, by means of simple differential pressure-responsive apparatus, an output effect suitable for indicating, recording, or controlling purposes and representative of the deviation of the temperature factor from a desired value.

It is an object of the invention, therefore, to provide a new and improved pneumatic temperature-responsive apparatus of the type described in aforesaid copending application in which the means for deriving an output effect representative of the deviation of the temperature factor from a desired value is considerably simplified.

It is another object of the invention to provide a new and improved pneumatic temperature-responsive apparatus of the type described, in which it is unnecessary to measure, regulate, or otherwise determine the actual fluid-mass flow of the elastic fluid used for measurement.

It is a further object of the invention to provide a new and improved pneumatic temperature-responsive apparatus of the type described in which the output effect representative of the desired temperature factor is derived from simple differential pressure-responsive apparatus.

In accordance with the invention, a pneumatic apparatus responsive to a temperature factor of a high-temperature elastic-fluid source comprises a conduit in fluid connection with the source, a first constriction in the conduit near the source, and a second constriction in the conduit spaced from the source, the conduit including provisions for cooling the fluid in its passage between the constrictions. The apparatus also includes a plurality of means for individually deriving effects representative of the differential pressures across the constrictions and means for deriving an output varying with deviation of the ratio of such effects from a given value and representative of the deviation of the temperature factor from a desired value.

For a better understanding of the present invention, together with other and further objects thereof, reference is had to the following description taken in connection with the accompanying drawing, and its scope will be pointed out in the appended claims.

Referring now to the single figure of the drawing, there is illustrated, partially schematically, a pneumatic temperature-responsive apparatus embodying the invention for measuring the temperature of a high-temperature elastic-fluid source.

Referring now more specifically to the drawing, there is represented a pneumatic apparatus responsive to the temperature of a high-temperature elastic-fluid source, such as that in a container 10, which may be a portion of the combustion chamber of an internal-combustion gas turbine. This apparatus includes a conduit 11 in fluid connection with the source 10 to conduct a flow of elastic fluid from the container 10. Disposed in the conduit 11 in the vicinity of the source 10 is an orifice plate 12 having a central constriction or orifice 12a through which elastic fluid from the source 10 flows. Spaced from the source 10 in the conduit 11 is a second orifice plate 13 having a central constriction or orifice 13a. The conduit 11 includes provisions for cooling the fluid in its passage from the constriction 12a to the constriction 13a. These cooling provisions may comprise merely an extended length of the conduit 11, as indicated by the dotted line portion, or, if desirable, cooling may be effected or supplemented by cooling fins 11a, it being preferable that the elastic fluid be cooled substantially to ambient temperature at the orifice 13a.

The temperature-responsive apparatus of the invention also includes a plurality of means for individually deriving effects representative of the differential pressures across the orifices 12a, 13a. This means may comprise a pair of differential pressure-responsive devices individually connected across the orifices, such as Sylphon bellows 14 and 15 connected to the high side and low side, respectively, of the orifice 12a, and the Sylphon bellows 16 and 17 connected to the high side and low side, respectively, of the orifice 13a. It is preferable in the design of the orifice plates 12 and 13 to select such sizes of the orifices 12a, 13a that, under normal operating conditions, the pressure drops across the two orifices are equal. When this relationship is followed, the orifice 12a will be considerably larger than the orifice 13a, since the hotter gases flowing through the orifice 12a are less dense than those at the orifice 13a and, therefore, travel at higher velocities, resulting in greater differential pressures for a given size of orifice.

The temperature-responsive apparatus of the invention further includes means for deriving an output varying with deviation of the ratio of the effects, specifically, the differential pressures across the orifices 12a and 13a, from a given value and representative of the deviation of the temperature factor from a desired value. This means may be in the form of a mechanism interconnecting the differential pressure devices 14–17, inclusive; specifically, a fulcrumed lever 18 pivotally connected at 18a to a link 19 interconnecting the opposed movable diaphragms of the devices 14 and 15 and pivotally connected at 18b to a link 20 interconnecting the opposed movable diaphragms of the devices 16 and 17. The lever 18 is supported on a knife-edge 24a of a horizontally adjustable fulcrum 24 and is biased to a neutral position by means of a pair of opposed springs 29 and 30 and arranged to balance each other at a position of lever 18 corresponding to the desired temperature of the elastic-fluid source. With this arrangement, the differential-pressure devices 14 and 15 act on the lever 18 with a moment opposite to that due to the action of the devices 16 and 17 and, as is shown in detail hereinafter, the displacement of the lever 18 is representative of a temperature factor of the elastic-fluid source in the container 10.

In the apparatus so far described, if the cooling provisions associated with the conduit 11 are adequate to maintain the temperature at the second orifice 13a substantially constant, the displacement of the lever 18 is representative of deviations of the actual temperature of the elastic fluid in the container 10 from a desired or reference value. However, if the temperature at the orifice 13a is not maintained constant and it is desired to obtain an effect representative of such deviations of the actual temperature of the elastic-fluid source, the apparatus further includes means for modifying the output of the apparatus, that is, the displacement of the lever 18, in accordance with variations in the temperature of the elastic fluid at the orifice 13a. This means may be in the form of a device for modifying the mechanism described, for example, an elastic-fluid temperature capsule 21 disposed in the conduit 11 in the vicinity of the orifice 13a and a pressure-responsive device, such as a Sylphon bellows 22, connected to the capsule 21 by a suitable fluid conduit 23, preferably flexible tubing. The Sylphon bellows 22 is connected to the adjustable fulcrum 24. With this arrangement, the displacement of the lever 18 from its neutral position is representative of deviations of the actual temperature of the elastic-fluid source in the container 10 from the desired or reference value. If desired the whole bellows 22 and fulcrum 24 may be adjusted laterally by suitable means such as a thumb screw 32 threaded in a support 33 and pivotally attached to one end of the bellows 22, thereby to adjust the reference or desired temperature of the elastic-fluid source from which deviations are measured.

As described above, the physical displacement of the lever 18 constitutes the output of the apparatus which is suitable for actuating, indicating, recording, or controlling apparatus. In case it is desired to effect a control in response to departures of the temperature of the elastic-fluid source from its reference value, the lever 18 may be provided with a simple switching mechanism, such as a movable contact 25 disposed selectively to engage stationary contacts 26a and 26b, depending upon whether the temperature rises above or falls below normal, respectively. The contacts 25 and 26a, 26b may be connected in circuit with any suitable source 27 and arranged to provide an output signal at either terminals 28a and 28b or 28a and 28c for application to any suitable reversing mechanism or device, such as to reversing windings of a reversible electric motor.

On the other hand, if it is desired to obtain an indication of deviations of the temperature of the elastic-fluid source above and below its reference value, the lever 18 may be provided with an extension or pointer 18c co-operating with a scale 31 to indicate deviations of temperature above and below the reference value.

The operation of the above-described temperature-responsive apparatus of the invention may be best understood by considering certain fundamental relationships. As pointed out in the aforesaid copending application, the mass flow of an elastic-fluid flow through an orifice is represented by the equation:

$$W = C_1 A_1 \sqrt{\frac{(P_1-P_2)P_1}{T_1}} = C_2 A_2 \sqrt{\frac{(P_2-P_3)P_2}{T_2}} \quad (1)$$

where $W$ = fluid mass flow
$A_1$ = effective area of orifice 12a
$A_2$ = effective area of orifice 13a
$P_1$ = high-side pressure at orifice 12a
$P_2$ = low-side pressure at orifice 12a
 = high-side pressure at orifice 13a
$P_3$ = low-side pressure at orifice 13a
$T_1$ = temperature of source at orifice 12a
$T_2$ = temperature of fluid at orifice 13a
$C_1, C_2$ = constants, including the gas constant R of the elastic fluid and the orifice constants of the orifices 12a and 13a.

If it be assumed that the differential pressure across the orifice 12a is small compared to the high-side pressure $P_1$ so that the ratio $P_1/P_2$ is substantially unity, Equation 1 may be transformed to:

$$T_1 = CT_2\left(\frac{P_1-P_2}{P_2-P_3}\right) \qquad (2)$$

From Equation 2 it is seen that if the temperature $T_2$ at the orifice $13a$ is maintained constant, the ratio of the differential pressures across the orifices $12a$ and $13a$ is representative of the temperature $T_1$ of the elastic-fluid source. This represents the conditions under which the temperature capsule 21 and associated pressure-responsive bellows 22 may be omitted and the fulcrum 24 may be fixed. Equation 2 further indicates that if the temperature $T_2$ at orifice $13a$ varies substantially, the desired temperature $T_1$ varies directly with the temperature $T_2$ and the aforementioned ratio.

Therefore, if the ratio of the lengths of the two portions of the lever 18 on opposite sides of its fulcrum $24a$ is selected to be inversely proportional to the ratio $$\frac{P_1-P_2}{P_2-P_3}$$

at the desired or reference temperature of the elastic-fluid source for a normal temperature $T_2$ at orifice $13a$, the system will be in balance. Under these conditions no electrical signal will be developed at terminals $28a$, $28b$, and $28c$ and the pointer $18c$ will indicate normal on scale 31. If now the temperature of the source rises, the differential pressure across orifice $12a$ will rise, adjusting lever 18 about its pivot in a clockwise direction to close the contacts 25 and $25b$ and develop a control signal at terminals $28a$, $28b$, and the pointer $18c$ will indicate "Hot" on scale 31. Obviously a decrease of temperature of the source will produce the opposite effect and a control signal will be developed at terminals $28a$, $28c$ and the pointer $18c$ will indicate "Cool" on scale 31.

If the temperature of the fluid at orifice $13a$ varies, capsule 21 and bellows 22 are effective to adjust the fulcrum 24 to maintain the system in balance for the desired temperature of the elastic-fluid source; otherwise the operation is as described above. Further, the nut 32 may be rotated to adjust the fulcrum 24 so that the ratio of the lengths of the two portions of the lever 18 is adjusted to correspond to the ratio of the differential pressures $$\frac{P_1-P_2}{P_2-P_3}$$

for a different reference temperature of the source, to deviations from which the system will respond as described above.

While there has been described what is at present considered to be the preferred embodiment of this invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. A pneumatic apparatus responsive to a temperature factor of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a plurality of means for individually deriving effects representative of the differential pressures across said constrictions; and means responsive jointly to said effects for deriving an output varying with deviation of the ratio of said effects from a given value whereby said output is representative of the deviation of the temperature factor of the source from a desired value.

2. A pneumatic apparatus responsive to the temperature of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a plurality of means for individually deriving effects representative of the differential pressures across said constrictions; means responsively jointly to said effects for deriving an output varying with deviation of the ratio of said effects from a given value; and means for modifying said output in accordance with the temperature of said elastic fluid at said second constriction, whereby said output is representative of the deviation of the temperature of the source from a desired value.

3. A pneumatic apparatus responsive to a temperature factor of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a pair of differential-pressure devices individually connected across said constrictions, and a mechanism interconnecting said devices for deriving a displacement representative of deviations of the temperature factor of the source from a desired value.

4. A pneumatic apparatus responsive to a temperature factor of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a fulcrumed lever, a pair of differential-pressure devices individually connected across said constrictions and connected to act on said lever with opposite moments, the displacement of said lever being representative of deviations of the temperature factor of the source from a desired value.

5. A pneumatic apparatus responsive to the temperature of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a pair of differential-pressure devices individually connected across said constrictions; a mechanism interconnecting said devices, and means for modifying said mechanism in accordance with the temperature of the elastic fluid at said second constriction, whereby the displacement of said mechanism is representative of deviations of the temperature of the source from a desired value.

6. A pneumatic apparatus responsive to the temperature of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a fulcrumed lever; a pair of differential-pressure devices individually connected across said constrictions and connected to act on said lever with opposite moments, and means responsive to the temperature of the elastic fluid at said second constriction for adjusting the fulcrum of said lever, whereby the displacement of said lever is representative of deviations of the temperature of the source from a desired value.

7. A pneumatic apparatus responsive to the temperature of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a fulcrumed lever; a pair of differential-pressure devices individually connected across said constrictions and connected to act on said lever with opposite moments; an elastic-fluid temperature capsule disposed in said conduit in the vicinity of said second constriction, and a pressure-responsive device connected to said capsule and disposed to adjust the fulcrum of said lever, whereby the displacement of said lever is representative of deviations of the temperature of the source from a desired value.

8. A pneumatic apparatus responsive to a temperature factor of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a plurality of means for individually deriving effects representative of the differential pressures across said constrictions; and means responsive jointly to said effects for deriving an indication varying with deviations of the ratio of said effects whereby said output is representative of deviations of the temperature factor of the source from a desired value.

9. A pneumatic apparatus responsive to a temperature factor of a high-temperature elastic-fluid source comprising: a conduit in fluid connection with said source; a first constriction in said conduit near said source; a second constriction in said conduit spaced from said source; said conduit including provisions for cooling said fluid in its passage between said constrictions; a plurality of means for individually deriving effects representative of the differential pressures across said constrictions; and means responsive jointly to said effects for deriving a control effect varying with deviations of the ratio of said effects whereby said output is representative of deviations of the temperature factor of the source from a desired value.

DAVID W. MOORE, Jr.

REFERENCES CITED

The following references are of record in the file of this patent:

UNITED STATES PATENTS

| Number | Name | Date |
|---|---|---|
| 773,684 | Speller | Nov. 1, 1904 |
| 1,007,178 | Billings | Oct. 31, 1911 |
| 1,630,307 | Norwood | May 31, 1927 |
| 1,630,318 | Tate | May 31, 1927 |
| 1,847,086 | Gargan | Mar. 1, 1932 |
| 1,881,266 | De Giers | Oct. 4, 1932 |